US010310681B2

(12) United States Patent
Takeyasu et al.

(10) Patent No.: US 10,310,681 B2
(45) Date of Patent: Jun. 4, 2019

(54) TRANSLUCENT CONDUCTIVE FILM

(71) Applicant: NITTO DENKO CORPORATION, Ibaraki-shi, Osaka (JP)

(72) Inventors: Tomohiro Takeyasu, Ibaraki (JP); Ikuo Kawamoto, Ibaraki (JP); Hitoshi Morita, Ibaraki (JP); Akira Arima, Ibaraki (JP)

(73) Assignee: NITTO DENKO CORPORATION, Ibaraki-shi (JP)

( * ) Notice: Subject to any disclaimer, the term of this patent is extended or adjusted under 35 U.S.C. 154(b) by 0 days.

(21) Appl. No.: 15/129,115

(22) PCT Filed: Mar. 25, 2015

(86) PCT No.: PCT/JP2015/059051
§ 371 (c)(1),
(2) Date: Sep. 26, 2016

(87) PCT Pub. No.: WO2015/147032
PCT Pub. Date: Oct. 1, 2015

(65) Prior Publication Data
US 2017/0123530 A1 May 4, 2017

(30) Foreign Application Priority Data
Mar. 26, 2014 (JP) ................................. 2014-063397

(51) Int. Cl.
G06F 3/044 (2006.01)

(52) U.S. Cl.
CPC .... G06F 3/044 (2013.01); G06F 2203/04103 (2013.01); G06F 2203/04112 (2013.01)

(58) Field of Classification Search
CPC ........... G06F 3/044; G06F 2203/04103; G06F 2203/04112
(Continued)

(56) References Cited

U.S. PATENT DOCUMENTS 6,376,924 B1 * 4/2002 Tomita .................... H01L 22/34
257/758
8,313,201 B2 * 11/2012 Wakizaka ............... G02B 1/111
359/599
(Continued)

FOREIGN PATENT DOCUMENTS

CN 103135870 A 6/2013
JP 2008-25025 A 2/2008
(Continued)

OTHER PUBLICATIONS

International Search Report, w/English translation and Written Opinion dated Jun. 16, 2015, issued in counterpart International Application No. PCT/JP2015/059051 (9 pages).
(Continued)

Primary Examiner — Benyam Ketema
(74) Attorney, Agent, or Firm — Westerman, Hattori, Daniels & Adrian

(57) ABSTRACT

A translucent conductive film includes a film substrate, a metal wiring layer provided as a pattern, and a colored layer. The film substrate has a plurality of protrusions on a surface at a side where the metal wiring layer is provided. The metal wiring layer has a line width of greater than 5 μm but less than 8 μm, and the metal wiring layer having a thickness of greater than or equal to 0.1 μm but less than 0.5 μm. The colored layer is provided on a main surface of the metal wiring layer at a viewing side but not on a side surface of the metal wiring layer.

6 Claims, 3 Drawing Sheets

(58) Field of Classification Search
USPC .......................................................... 345/174
See application file for complete search history.

(56) References Cited

U.S. PATENT DOCUMENTS

| | | | | |
|---|---|---|---|---|
| 8,563,870 | B2* | 10/2013 | Tsuno | H05K 1/0313 174/255 |
| 2009/0272560 | A1* | 11/2009 | Tokunaga | H05K 3/106 174/126.1 |
| 2009/0295285 | A1* | 12/2009 | Tokunaga | H01L 51/5212 313/505 |
| 2012/0138342 | A1* | 6/2012 | Muramoto | G06F 3/0412 174/254 |
| 2013/0133933 | A1* | 5/2013 | Tsuno | H05K 1/0313 174/255 |
| 2013/0299216 | A1* | 11/2013 | Ichiki | G06F 3/044 174/255 |
| 2014/0111711 | A1* | 4/2014 | Iwami | B32B 7/02 349/12 |
| 2014/0345917 | A1* | 11/2014 | Takada | G06F 3/0412 174/255 |
| 2015/0177876 | A1* | 6/2015 | Ishii | G06F 3/044 345/174 |
| 2015/0331280 | A1* | 11/2015 | Wakabayashi | G02F 1/133512 349/57 |
| 2015/0378461 | A1* | 12/2015 | Hashimoto | B29C 48/21 428/172 |
| 2018/0170016 | A1* | 6/2018 | Du | G06F 3/0412 |

FOREIGN PATENT DOCUMENTS

| | | |
|---|---|---|
| JP | 2009-277924 A | 11/2009 |
| JP | 2010-160915 A | 7/2010 |
| JP | 2010-257350 A | 11/2010 |
| JP | 2011-186888 A | 9/2011 |
| JP | 2012-22358 A | 2/2012 |
| JP | 2013-129183 A | 7/2013 |
| JP | 5224203 B1 | 7/2013 |
| JP | 2014-16944 A | 1/2014 |

OTHER PUBLICATIONS

Office Action dated Mar. 27, 2017, issued in counterpart Japanese Application No. 2014-063397, with English translation. (7 pages).
Office Action dated Sep. 20, 2017, issued in counterpart Korean Application No. 10-2016-7023598, with English translation. (7 pages).
English translation Written Opinion dated Jun. 16, 2015, issued in counterpart Application No. PCT/JP2015/059051 (6pages).
English translation of International Preliminary Report on Patentability (Form PCT/IB/373) issued in counterpart International Application No. PCT/JP2015/059051 dated Sep. 27, 2016, with Form PCT/ISA/237 (7 pages).
Decision to Grant a Patent dated Jul. 18, 2017, issued in counterpart Japanese Application No. 2014-063397, with English Translation. (6 pages).
Office Action dated Aug. 22, 2018, issued in counterpart Taiwanese Application No. 104109818, with English translation. (7 pages).
Office Action dated Jun. 15, 2018, issued in counterpart Chinese Application No. 201580016276.1, with English translation. (17 pages).
Decision for Grant of Patent dated Jul. 30, 2018, issued in counterpart Korean Patent Application No. 10-2016-7023598, with English translation. (3 pages).
Office Action dated Jan. 23, 2019, issued in counterpart to CN Application No. 201580016276.1, with English translation (15 pages).

* cited by examiner

TRANSLUCENT CONDUCTIVE FILM

CROSS REFERENCE TO RELATED APPLICATIONS

This is the National Stage of International Application No. PCT/JP2015/059051, filed Mar. 25, 2015, which claims the benefit of Japanese Patent Application No. 2014-063397, filed Mar. 26, 2014, the disclosure of which are hereby incorporated by reference in their entirety.

TECHNICAL FIELD

The present invention relates to a translucent conductive film that can be applied to an input display device or the like capable of inputting information by a touch with a finger, a stylus pen and the like.

BACKGROUND ART

Conventionally, a translucent conductive film having a film substrate, a metal wiring layer provided as a pattern in a mesh shape, and a colored layer (blackened layer) in this order is known (patent document 1). Such a translucent conductive film has a good electric conductivity and flexibility, and thus it is drawing attention as an electrode material of touch sensors that could replace a translucent conductive film using an indium tin oxide (ITO).

DOCUMENT LIST

Patent Document(s)

Patent Document 1: Japanese Laid-Open Patent Publication No. 2013-129183

SUMMARY OF INVENTION

Technical Problem

However, the conventional translucent conductive film has a problem that a mesh pattern of a metal wiring layer is still visually recognizable by a user of a touch sensor, and thus there is a need to mitigate such a problem.

It is an object of the present invention to provide a translucent conductive film having an improved productivity, and also achieving high reliability since there is no occurrence of a wire break in a metal wiring and having good usability since the metal wiring layer is less likely to be visually recognized.

Solution to Problem

The inventors carried out assiduous studies on a configuration of a translucent conductive film, and as a result, reached the findings that, by focusing on a surface geometry of the film substrate, as well as a size of a metal wiring layer and an arrangement of a colored layer provided over the film substrate and making them have a suitable configuration, size and arrangement, a translucent conductive film can be provided that has an improved productivity, and also achieving high reliability since there is no occurrence of a wire break in a metal wiring and having good usability since a mesh shaped pattern of the metal wiring layer is less likely to be visually recognized.

That is to say, the summary of the present invention is as follows.

(1) A translucent conductive film comprising a film substrate, a metal wiring layer provided as a pattern, and a colored layer, the film substrate having a plurality of protrusions on a surface at a side where the metal wiring layer is provided, the metal wiring layer having a line width of greater than 5 μm but less than 8 μm, and the metal wiring layer having a thickness of greater than or equal to 0.1 μm but less than 0.5 μm, the colored layer being provided on a main surface of the metal wiring layer at a viewing side but not on a side surface of the metal wiring layer.

(2) The translucent conductive film according to the aforementioned (1), wherein the protrusion has an outer diameter of greater than 0 but less than or equal to 5 μm in a plan view of a surface of the film substrate at a side where the metal wiring layer is provided.

(3) The translucent conductive film according to the aforementioned (1), wherein the protrusion has a height of less than 3 μm.

(4) The translucent conductive film according to the aforementioned (1), wherein the metal wiring layer has a flattened geometry, and a ratio of the line width to the thickness is 15 to 50.

(5) The translucent conductive film according to the aforementioned (1), wherein the metal wiring layer is provided in a mesh shape.

(6) A translucent conductive film comprising a film substrate having a plurality of protrusions on both surfaces thereof, a first metal wiring layer provided over one of the surfaces of the film substrate, a first colored layer provided on the first metal wiring layer, a second colored layer provided over the other surface of the film substrate, and a second metal wiring layer provided on the second colored layer, each of the first and second metal wiring layers having a line width of greater than 5 μm less than 8 μm, and a thickness of greater than or equal to 0.1 μm but less than 0.5 μm, the first colored layer being laminated on a main surface of the first metal wiring layer at a side opposite to the film substrate but not provided on a side surface of the first metal wiring layer, the second colored layer being laminated on a main surface of the second metal wiring layer on a film substrate side but not provided on a side surface of the second metal wiring layer.

Effects of Invention

According to the invention, a plurality of protrusions are provided on a surface of a film substrate. Accordingly, the film substrate is given a slippery property and resistance to abrasion. When forming a metal wiring layer continuously, productivity can be improved by increasing a film formation rate thereof while maintaining a high quality.

The metal wiring layer has a predetermined line width, and, on a surface of the metal wiring layer at a viewing side, a colored layer that absorbs light from outside is provided. Thereby, when laminating the metal wiring layer over the film substrate, a wire break in a metal wiring due to the protrusions of the film substrate can be prevented and high reliability can be achieved. Also, the metal wiring layer such as a mesh pattern can be prevented from becoming bright and visually recognizable, and thus a good usability can be achieved.

Further, the metal wiring layer has a thickness smaller than that of the metal wiring layer of the related art, which is greater than or equal to 0.1 m but less than 0.5 μm. With such a configuration, the metal wiring layer can be made less visually recognizable, since the side surface of the metal wiring layer does not become bright when light from outside is obliquely incident on a translucent conductive film. Also, productivity of the translucent conductive film is improved, since a colored layer is not provided on the side surface of the metal wiring layer and it is not necessary to perform a step of forming a colored layer on the side surface of the metal wiring layer.

Particularly, a more significant effect can be obtained when forming a metal wiring layer on each surface on either side of the film substrate, since a wire break in the metal wiring layer can be prevented on both faces, and the metal wiring layer can be prevented from being visually recognizable on both faces.

DESCRIPTION OF THE EMBODIMENTS

Hereinafter, embodiments of the present invention will be described in detail with reference to the attached drawings.

Figure 1:
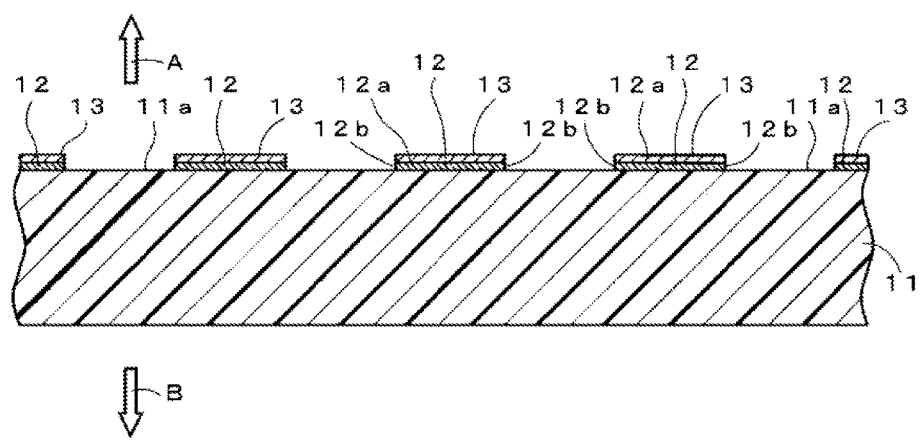
FIG. 1 is a cross sectional view schematically showing a configuration of a translucent conductive film according to an embodiment of the present invention.

FIG. 1 is a diagram schematically showing a configuration of a translucent conductive film according to the present embodiment. It is to be noted that length, width, and thickness of each element shown in FIG. 1 are exemplary, and length, width, and thickness of each element of the translucent conductive film of the present invention are not limited to those shown in FIG. 1.

Figure 2A:
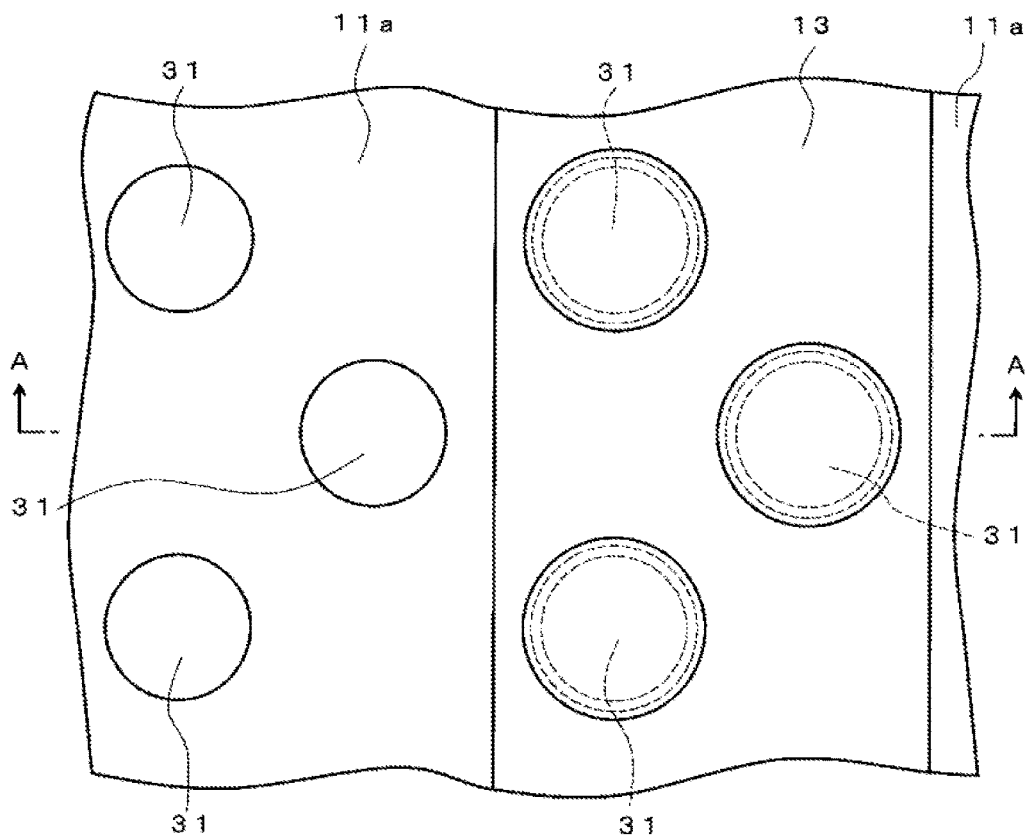
FIG. 2A is a partially enlarged view in a plan view of the translucent conductive film shown in FIG. 1.
Figure 2B:
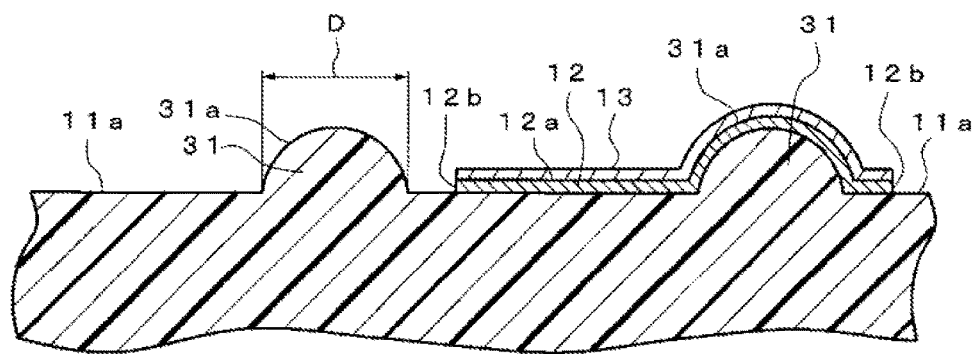
FIG. 2B is partially enlarged view of the translucent conductive film taken along line A-A in FIG. 2A.

As shown in FIG. 1, the translucent conductive film of the present invention has at least a film substrate 11, a metal wiring layer 12 provided as a pattern in a mesh shape, and a colored layer 13, in this order. Specifically, the film substrate 11 has a plurality of protrusions 31 on a surface 11a thereof at a side where the metal wiring layer 12 is to be provided as shown in FIGS. 2A and 2B. Each wiring constituting the metal wiring layer 12 is provided continuously over both the surface 11a of the film substrate and a surface 31a of the protrusion 31. The metal wiring layer 12 has a line width of greater than 5 μm but less than or equal to 8 μm, and the metal wiring layer has a thickness of greater than or equal to 0.1 μm but less than 0.5 μm. The colored layer 13 is characterized in that it is laminated on a main surface 12a of the metal wiring layer 12 at a viewing side A, but not provided on the side surface 12b of the metal wiring layer 12.

As for the translucent conductive film, a surface resistance value at a side provided with the metal wiring layer is preferably 0.1Ω/□ to 400Ω/□, more preferably 0.1Ω/□ to 100Ω/□, and particularly preferably 1Ω/□ to 60Ω/□. The translucent conductive film 1 has a transmittance of preferably greater than or equal to 80%, and more preferably greater than or equal to 85%.

As long as the translucent conductive film of the present invention has a film substrate, a metal wiring layer and a colored layer, in this order, it may include another layer between the respective layers. For example, the translucent conductive film may be provided with an adhesive resin layer for increasing adhesion that is disposed between the film substrate and the metal wiring layer, or may be provided with a metal wiring layer and/or a colored layer disposed on both sides of the film substrate.

(Film Substrate)

The film substrate as used herein supports the metal wiring layer. The film substrate may be single-layered or may be multi-layered. The film substrate has a thickness of preferably 20 μm to 200 μm, considering the transparency and ease of handling.

The film substrate has a plurality of protrusions on a surface thereof at a side where the metal wiring layer is to be provided. By providing a plurality of protrusions on the surface of the film substrate, the film substrate is made to have a slippery property and resistance to abrasion, and when forming a metal wiring layer continuously, productivity can be improved by increasing a film formation rate thereof while maintaining a high quality.

A protrusion has an outer diameter D of greater than 0 but less than or equal to 5 μm, and preferably 0.5 μm to 3 μm, in a plan view of a surface of the film substrate at a side where the metal wiring layer is to be provided. The outer diameter of the protrusion can be measured, for example, by carrying out an image observation with a predetermined magnification on a surface of the film substrate at a side where the metal wiring layer is to be provided. In a case where the outer diameter D is greater than 5 μm, a wire break may be produced in the metal wiring near a boundary section between the surface of the film substrate and the surface of the protrusion.

Taking a flat surface of the film substrate as a reference level, the height of the protrusion is preferably greater than 0 but less than or equal to 3 m, and more preferably, 0.1 μm to 2 μm.

In the present embodiment, the geometry of the protrusion is generally a dome shape with a cross section along the plane of the film substrate being generally circular, and a cross section in a thickness direction being generally semicircular (FIGS. 2A and 2B). However, the protrusion of the present invention may be of a geometry other than a dome shape, as long as the protrusions provide the film substrate with a slippery property and resistance to abrasion, and a high quality metal wiring layer can be formed continuously at a high speed.

As a measure of providing protrusions on a film substrate, it is possible to use a technique such as dispersing a lubricant in the film substrate or applying a binder, in which a plurality of particles are dispersed, on a film surface.

A film constituting the film substrate is preferably a polymer film having good transparency and heat resistance. The aforementioned polymer film is, for example, a polyethyleneterephthalate film, a polyethylenenaphthalate film, a polycycloolefin film, a polycarbonate film or a polysulfone film. For example, such polymer films are available from Mitsubishi Plastics Inc., Teijin Du Pont Films Japan Limited, Zeon Corporation, and Teijin Chemicals Ltd., etc.

(Metal Wiring Layer)

The metal wiring layer as used herein is provided as a pattern, for example, in a mesh shape to provide translucency. The mesh pattern of the aforementioned metal wiring layer is not particularly limited, and for example, provided as a square lattice, a diamond-shaped lattice, or a polygonal lattice.

A material forming the metal wiring layer is not limited as long as it has electrical conductivity, but it is preferably silver, copper or an alloy thereof, and more preferably, copper.

The metal wiring layer has a line width of greater than 5 μm but less than 8 μm, and preferably greater than 5.5 μm but less than or equal to 7 μm. With a line width within such a range, a wire break due to the protrusions of the film substrate can be prevented. With a line width of less than or equal to 5 μm, the mesh pattern of the metal wiring layer can be made less visually recognizable, but because of the protrusions of the film substrate, a wire break in a metal wiring occurs more frequent, and quality and reliability will decrease when mass-produced. On the other hand, with the line width of greater than or equal to 8 μm, the mesh pattern of the metal wiring layer is visually recognizable in a noticeable manner.

The metal wiring layer has a thickness of greater than or equal to 0.1 μm but less than 0.5 μm, preferably greater than or equal to 0.1 μm but less than or equal to 0.4 μm, and more preferably, 0.15 μm to 0.35 μm. With a metal wiring layer having a thickness of, for example, less than 2 μm, the mesh pattern can be furthermore prevented from being visually recognizable. With such a configuration, it can be made less visually recognizable, since the side surface of the metal wiring layer does not become bright when light from outside is obliquely incident on a translucent conductive film. Also, productivity of the translucent conductive film is improved, since a colored layer is not provided on the side surface of the metal wiring layer and it is not necessary to perform a step of forming a colored layer on the side surface of the metal wiring layer.

The metal wiring layer of the present invention is characterized in that it has a flattened shape, and a ratio of the line width to the thickness (line width/thickness) is preferably greater than or equal to 10 but less than 80, and more preferably, 15 to 50. A translucent conductive film satisfying such a relationship has a good productivity, and a wire break in the metal wiring does not occur and the mesh pattern of the metal wiring layer is less visually recognizable.

In order to obtain an electric conductivity required for a touch panel sensor, the metal wiring layer has a cross sectional area of preferably 0.5 μm$^2$ to 4 μm$^2$, more preferably, 0.5 μm$^2$ to 3.2 μm$^2$, and particularly preferably, 0.5 μm$^2$ to 2.5 μm$^2$.

In order to obtain sufficient translucency, the metal wiring layer has a pitch interval of preferably 200 μm to 800 μm, and more preferably, 350 μm to 650 μm. The metal wiring layer has an aperture ratio of preferably 95% to 99%, and more preferably, 96% to 99%.

A method of forming the aforementioned metal wiring layer may be, for example, a method including forming a metal layer over an entire surface of the film substrate, thereafter laminating a predetermined resist pattern (resist pattern) on the metal layer, and removing the metal layer in an unnecessary region by etching (etching) such that a mesh-shaped metal wiring layer is formed. For example, the method of forming the metal layer is a sputtering (spattering) method, a plating (plating) method or a combination thereof.

(Colored Layer)

A colored layer as used herein is laminated on a surface at a viewing side of the metal wiring layer, and absorbs light from outside, and thus prevents the mesh pattern from becoming bright and visually recognizable. With the translucent conductive film of the present invention, since the metal wiring layer has a small thickness, it is not necessary to form a colored layer on the side surface of the metal wiring layer. Therefore, productivity of the translucent conductive film is good.

The colored layer may be single-layered or may be multi-layered. The total thickness of the colored layer is preferably 5 nm to 2 μm, more preferably 10 nm to 1 μm, and particularly preferably 10 nm to 60 nm. The line width of the colored layer is basically the same as the metal wiring layer, and, for example, greater than 5 μm but less than 8 μm, and preferably greater than 5.5 μm but less than or equal to 7 μm.

A tone of the colored layer is preferably black or dark gray. Therefore, the colored layer may be referred to as a blackened layer, and a process of providing the blackened layer may be referred to as a blackening process.

A material forming the colored layer is not particularly limited, as long as it absorbs light from outside, and, for example, a blackened layer (black copper or black nickel) formed by a plating technique as described in Japanese Laid-Open Patent Publication No. 2008-25025, and a blackened layer (copper oxide, copper nitride, nickel nitride or nickel oxide) formed by a sputtering technique as described in Japanese Laid-Open Patent Publication No. 2013-129183 can be used.

Depending on the lamination structure, methods described below can be employed as a colored layer forming method of forming the colored layer only on a surface of the metal wiring layer at the viewing side. In a case of the structure of FIG. 1, the colored layer forming method is, for example, a method (first manufacturing method) including, after having formed a metal layer over an entire surface of the film substrate by plating, forming a colored layer by applying a blackening process by plating on the surface of the metal layer, and, thereafter etching the metal layer and the colored layer together. With this manufacturing method, since the production of the metal layer to the blackening process can be performed continuously, reduction in manufacturing time and costs can be achieved and also an environment load can be reduced.

As set forth above, according to the present embodiment, the plurality of protrusions 31 are provided on the surface 11a of the film substrate 11. Thereby, the film substrate 11 is given a slippery property and resistance to abrasion. When forming the metal wiring layer 12 continuously, productivity can be improved by increasing a film formation rate thereof while maintaining a high quality. Also, the metal wiring layer 12 has a predetermined line width, and, on a main surface 12a of the metal wiring layer 12 at a viewing side A, a colored layer 13 that absorbs light from outside is provided. Thereby, when laminating the metal wiring layer 12 over the film substrate 11, a wire break in the metal wiring due to the protrusions 31 of the film substrate 11 can be prevented, and the metal wiring layer 12 such as a mesh pattern can be prevented from becoming bright and visually recognizable, and a good usability can be achieved. Further, the metal wiring layer 12 has a thickness of less than 0.5 μm. With such a configuration, the mesh pattern can be made less visually recognizable, since the side surface 12b of the metal wiring layer 12 does not become bright when light from outside is obliquely incident on a translucent conductive film. Also, productivity of the translucent conductive film is improved, since a colored layer is not provided on the side surface 12b of the metal wiring layer 12 and it is not necessary to perform a step of forming a colored layer on the side surface 12b of the metal wiring layer 12.

Note that, in FIG. 1, the metal wiring layer is provided over a surface at a viewing side of the film substrate, but alternatively, it may be provided over a surface at a display device side of the film substrate.

Figure 3:
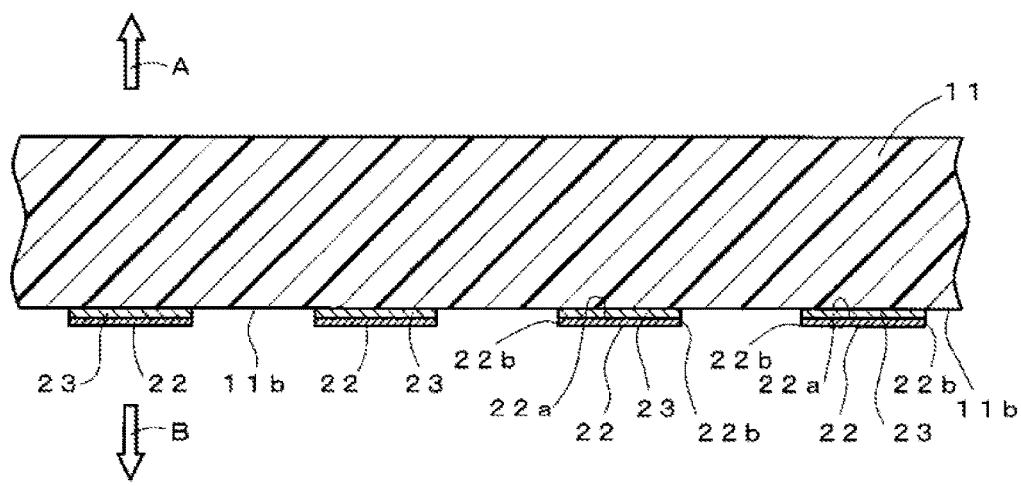
FIG. 3 is a cross sectional view showing a variant of the translucent conductive film shown in FIG. 1.

Specifically, as shown in FIG. 3, the translucent conductive film has a film substrate 11, a colored layer 23 provided as a pattern in a mesh shape, and a metal wiring layer 22, in this order. The film substrate 11 has a plurality of protrusions (not shown) on a surface 11b at a side where the metal wiring layer 22 is provided, i.e., a side B opposite to the viewing side A (i.e., a display device side in a case where the translucent conductive film is used as a touch sensor by being laminated on a display device). The metal wiring layer 22 has a line width and a thickness that are similar to those of the metal wiring layer 12 of FIG. 1. The colored layer 23 is characterized in that it is laminated on a main surface 22a of the metal wiring layer 22 at a viewing side A, but, similarly to the configuration of FIG. 1, not provided on the side surface 22b of the metal wiring layer 22.

In a case of the structure of FIG. 3, as a colored layer forming method, for example, a method (second manufacturing method) may include, after having formed a colored layer by sputtering on a film substrate before forming a metal layer, forming a metal layer on a surface of the colored layer by sputtering, and thereafter etching the metal layer and the colored layer together. This manufacturing method can also achieve reduction of manufacturing time and costs and reduction of an environment load, since the production of the metal layer to the blackening process can be performed continuously.

As described above, the configuration shown in FIG. 3 can also achieve an effect similar to the effect of the configuration of FIG. 1.

Also, the metal wiring layer may be provided on both sides of the film substrate. In such a case, the translucent conductive film of the present invention includes colored layers each laminated on a surface at a viewing side of each of the metal wiring layers.

Figure 4:
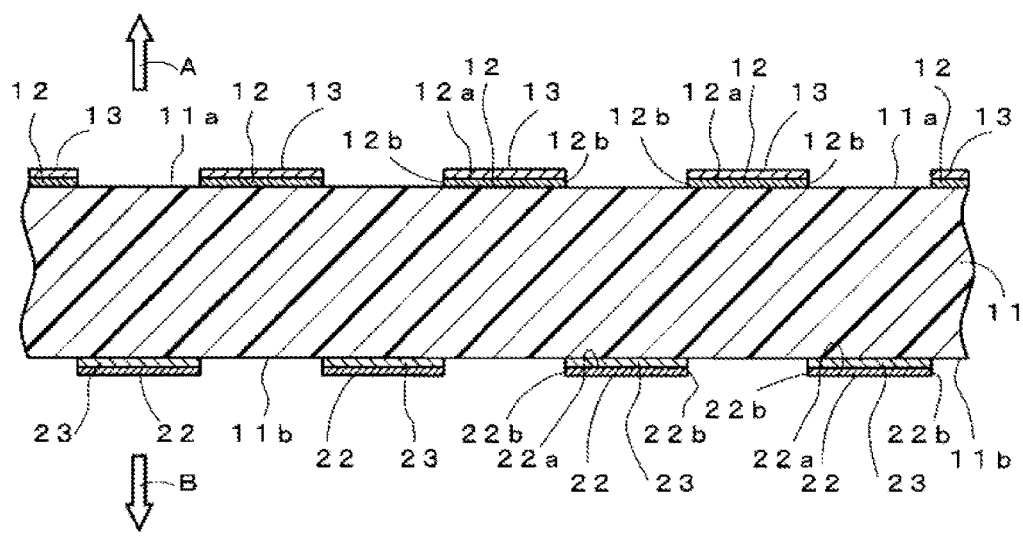
FIG. 4 is a cross sectional view showing another variant of the translucent conductive film shown in FIG. 1.

Specifically, as shown in FIG. 4, a translucent conductive film is provided with a film substrate 11 having a plurality of protrusions (not shown) on both surfaces 11a and 11b thereof, a metal wiring layer 12 (first metal wiring layer) provided over one of the surfaces 11a of the film substrate, a colored layer 13 (first colored layer) provided on the metal wiring layer 12, a colored layer 23 (second colored layer) provided over the other surface 11b of the film substrate 11, and the metal wiring layer 22 (second metal wiring layer) provided on the colored layer 23.

The metal wiring layers 12 and 22 each has a line width greater than 5 μm but less than 8 μm, and the metal wiring layers 12 and 22 each has a thickness of greater than or equal to 0.1 μm but less than 0.5 μm. Also, the colored layer 13 is laminated on the main surface 12a of the metal wiring layer 12 at a side opposite the film substrate 11, but not provided on the side surface 12b of the metal wiring layer 12. Furthermore, the colored layer 23 is laminated on the main surface 22a of the metal wiring layer 22 at the film substrate 11 side, but not provided on the side surface 22b of the metal wiring layer 22. According to the configuration shown in FIG. 4, the aforementioned effect can be obtained more notably.

The translucent conductive film according to the present embodiment has been described above, but the present invention is not limited to the embodiment described above, and various modifications and alterations are possible based on the technical idea of the present invention.

EXAMPLE

Example of the present invention will be described below.

Example

On a surface of a polyethyleneterephthalate film having a thickness of 50 m, a binder (manufactured by DIC Corporation, product name "ELS888") in which a plurality of particles (manufactured by Soken Chemical & Engineering Co., Ltd., product name "MX180-TA") are dispersed was applied to manufacture a film substrate having a plurality of protrusions (1.2 μm in height taking a flat surface of the film substrate as a reference) on the surface. Then, on the surface of the film substrate on which the binder is applied, a copper layer having a thickness of 80 nm was formed by DC sputtering to form a laminated body.

Then, the laminated body was immersed in an electrolyte copper plating bath to increase the thickness of the copper layer by an electrolysis plating method with a current density of 20 A/dm$^2$, until the copper layer had a total thickness of 200 nm (0.2 μm). The precipitated metal at this step was brown in color. Thereafter, the current density was changed to 50 A/dm$^2$ and plating was continued to laminate a colored layer comprising black copper on a surface of the copper layer. A laminated body having the film substrate, the copper layer and the colored layer was removed from the plating bath, and rinsed and dried.

Then, a predetermined resist pattern was laminated on a surface of the blackened layer, and the copper layer and the colored layer at a region where they are not required were removed at the same time by etching, and thereafter, the resist was peeled to form a metal wiring layer having a regular square lattice shape (mesh shape) having the colored layer at an outermost surface and having a line width of 6 μm, a pitch interval of 450 nm, a thickness of 0.2 m, and an aperture ratio of 97%. The translucent conductive film obtained in this manner had a transmittance of 88%, and a surface resistance value of 3 Ω/□.

Comparative Example 1

A translucent conductive film was manufactured by a method similar to that of the Example, except that the plating time was changed and the metal wiring layer had a thickness of 2 μm.

Comparative Example 2

A translucent conductive film was manufactured by a method similar to that of the Example, except that the plating time and the resist pattern were changed and the metal wiring layer had a line width of 10 μm and a thickness of 2 μm.

Comparative Example 3

A translucent conductive film was manufactured by a method similar to that of the Example, except that the resist pattern was changed and the metal wiring layer had a line width of 8 μm.

Comparative Example 4

A translucent conductive film was manufactured by a method similar to that of the Example, except that the resist pattern was changed and the metal wiring layer had a line width of 3 μm.

Then, the translucent conductive films of the Example and Comparative Examples were measured and evaluated as follows.

(Measurement of Line Width and Pitch Interval of the Metal Wire Wiring Layer)

Using a microscope (manufactured by Olympus Corporation, device name "MX61L"), a micrograph was captured and each value was measured based on the captured photograph.

(Measurement of Thickness of the Metal Wiring Layer)

A part of the translucent conductive film manufactured by the aforementioned method was cut and cast with resin, and the cross section was observed using a microscope (manufactured by Hitachi, Ltd., device name "HF2000") and each value was measured.

(Calculation of Aperture Ratio)

An aperture ratio was calculated using the following equation:

"(aperture ratio)–{(mesh opening length/pitch interval)$^2$}×100", where the pitch interval in the metal wiring layer is a length between a center of one of two electric wirings that are closely arranged in a unit pattern and a center of the other of the two electric wirings, and the length of the mesh opening is a value obtained by subtracting the aforementioned line width of the wiring from the aforementioned pitch interval.

(Measurement of Transmittance)

Using a multi beam spectrophotometer (manufactured by Hitachi, Ltd., device name "U4100"), a transmittance of 400 to 700 nm was measured and an average value thereof was obtained.

(Evaluation of a Wire Break in the Metal Wiring)

An entire surface of the manufactured translucent conductive film was observed with naked eyes using a magnifying glass to check whether there is any wire break.

(Evaluation of Prevention of Visual Recognition of the Mesh Pattern)

The manufactured translucent conductive film was visually inspected under a three wavelength light-emitting type fluorescent light source to check whether a mesh pattern is visually recognizable from both a front direction and an oblique direction, and a case in which the mesh pattern was not visually recognized was evaluated as "GOOD" and in a case where it was clearly visually recognized was evaluated as "NOT GOOD".

Results of measurements and evaluations described above are shown in Table 1.

TABLE 1

| | METAL WIRING LAYER | | PREVENTION OF | |
| --- | --- | --- | --- | --- |
| | LINE WIDTH μm | THICK-NESS μm | WIRE BREAK | VISUAL RECOGNITION OF MESH PATTERN |
| EXAMPLE | 6 | 0.2 | NO | GOOD |
| COMPARATIVE EXAMPLE 1 | 6 | 2 | NO | NOT GOOD |
| COMPARATIVE EXAMPLE 2 | 10 | 2 | NO | NOT GOOD |
| COMPARATIVE EXAMPLE 3 | 8 | 0.2 | NO | NOT GOOD |
| COMPARATIVE EXAMPLE 4 | 3 | 0.2 | YES | GOOD |

Referring to the results in Table 1, in the Example, the metal wiring layer had a line width of 6 μm and a thickness of 0.2 μm, and the mesh pattern was not visually recognizable from a front direction or from an oblique direction, and a wire break in the metal wiring was also not observed.

Whereas, with Comparative Example 1, the metal wiring layer had a line width of 6 μm and a thickness of 2 μm, and although a wire break in the metal wiring was not observed, the mesh pattern was visually recognized when viewed from an oblique direction.

With Comparative Example 2, the metal wiring layer had a line width of 10 μm and a thickness of 2 μm, and although a wire break in the metal wiring was not observed, the mesh pattern was visually recognized when viewed from a front direction and from an oblique direction.

With Comparative Example 3, the metal wiring layer had a line width of 8 μm and a thickness of 0.2 μm, and although a wire break in the metal wiring was not observed, the mesh pattern was visually recognized when viewed from a front direction.

With Comparative Example 4, the metal wiring layer had a line width of 3 μm and a thickness of 0.2 μm, although the mesh pattern was not visually recognized, a wire break in the metal wiring was observed.

INDUSTRIAL APPLICABILITY

The translucent conductive film according to the present invention is suitable for an electrode material of touch sensors. Touch sensors are preferably capacitive sensing type touch sensors which are used in portable terminals such as smartphones or tablet terminals (Slate PCs).

LIST OF REFERENCE SIGNS

11 film substrate
11*a* surface
11*b* surface
12 metal wiring layer
12*a* main surface
12*b* side surface
13 colored layer
22 metal wiring layer
22*a* main surface
22*b* side surface
23 colored layer
31 protrusion
31*a* surface

The invention claimed is:

1. A translucent conductive film comprising:
a film substrate, a metal wiring layer provided as a pattern, and a colored layer,
the film substrate having a plurality of protrusions on a surface at a side where the metal wiring layer is provided,
the metal wiring layer having a line width of greater than 5 μm but less than 8 μm, and the metal wiring layer having a thickness of greater than or equal to 0.1 μm but less than 0.5 μm,
the colored layer being provided on a main surface of the metal wiring layer at a viewing side but not on a side surface of the metal wiring layer.

2. The translucent conductive film according to claim 1, wherein the protrusion has an outer diameter of greater than 0 but less than or equal to 5 μm in a plan view of a surface of the film substrate at a side where the metal wiring layer is provided.

3. The translucent conductive film according to claim 1, wherein the protrusion has a height of greater than 0 but less than 3 μm.

4. The translucent conductive film according to claim 1, wherein the metal wiring layer has a flattened geometry, and a ratio of the line width to the thickness is 15 to 50.

5. The translucent conductive film according to claim 1, wherein the metal wiring layer is provided in a mesh shape.

6. A translucent conductive film comprising:
- a film substrate having a plurality of protrusions on both surfaces thereof;
- a first metal wiring layer provided over one of the surfaces of the film substrate;
- a first colored layer provided on the first metal wiring layer;
- a second colored layer provided over the other surface of the film substrate; and
- a second metal wiring layer provided on the second colored layer,
- each of the first and second metal wiring layers having a line width of greater than 5 µm but less than 8 µm, and a thickness of greater than or equal to 0.1 µm but less than 0.5 µm,
- the first colored layer being laminated on a main surface of the first metal wiring layer at a side opposite to the film substrate but not provided on a side surface of the first metal wiring layer,
- the second colored layer being laminated on a main surface of the second metal wiring layer on a film substrate side but not provided on a side surface of the second metal wiring layer.

* * * * *